Figure 1:
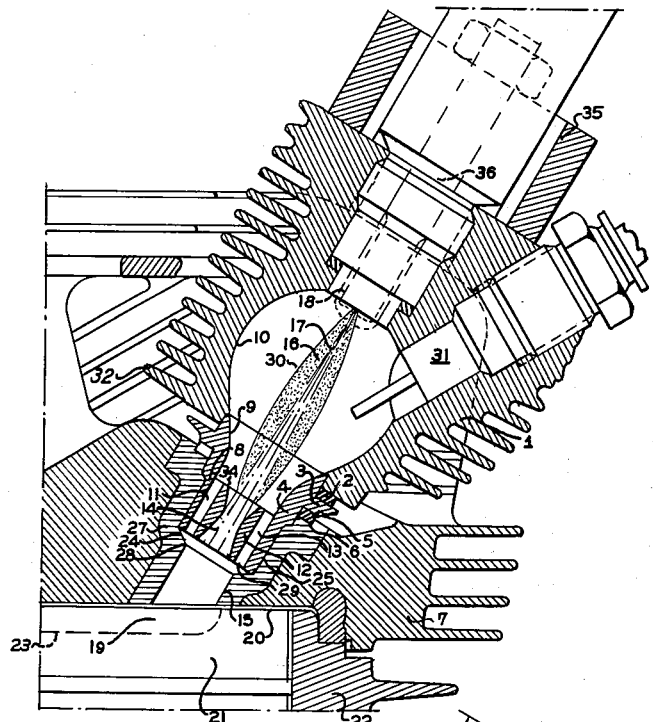

Feb. 28, 1961 — W. STEIDLER — 2,972,987

INTERNAL COMBUSTION ENGINES

Filed Aug. 18, 1959

United States Patent Office 2,972,987
Patented Feb. 28, 1961

2,972,987

INTERNAL COMBUSTION ENGINES

Walter Steidler, Feudenheimerstrasse 38,
Ilvesheim, Germany

Filed Aug. 18, 1959, Ser. No. 834,522

Claims priority, application Germany June 16, 1959

1 Claim. (Cl. 123—32)

The invention relates to an internal combustion engine and in particular to an engine of the liquid fuel injection compression ignition kind in which towards the end of a compression stroke of the engine liquid fuel is injected from an injection nozzle into an auxiliary chamber defining an auxiliary combustion space which is symmetrical with reference to the axis of the injection nozzle. The auxiliary chamber is provided in that part facing the cylinder space with an insert piece. This insert piece consists of an outer and an inner cylindrical sleeve interconnected by a plurality of rib-like structures, the inner sleeve defining an inner duct having a least cross-sectional area which is less than the sum of the least cross-sectional areas of the outer ducts defined between the inner and outer sleeves and the interconnecting ribs. The fuel jet is directed towards the inner duct and contacts with its outer envelope the inner wall of the inner sleeve. The dimensions of the auxiliary chamber and insert piece are such that at the end of the compression stroke of the piston between 30% and 70% of the combustion air is in the auxiliary chamber and the ducts. Furthermore, the volume measured in cm.$^3$ of the auxiliary combustion space divided by the sum of the least cross-sectional areas of the outer and inner ducts measured in cm.$^2$ gives a value between 20 and 100 cm., this being a measure of the throttling effect exerted by the insert piece upon the air flowing through the inner duct during the compression stroke. As a result of this throttling effect the air has such a low velocity that it neither retains the fuel jet in the auxiliary chamber nor causes it to split up.

With an engine of this kind and acting on the assumption that the temperatures of the insert piece and auxiliary chamber are adjusted to such values as to give rise to a very short ignition delay, it is possible to obtain a very smooth combustion and it is therefore possible to employ fuels which are difficult to ignite, such as, for example, petrol. With a hitherto proposed arrangement employing such an insert piece, the external wall of the outer sleeve forms a substantially continuous surface with the wall of a wide, cylindrical firing channel, which channel constitutes the connection to the cylinder space and has a cross-sectional area which is about five times that of the sum of the least cross-sectional areas of the insert ducts. Due to this large cross-sectional difference, the ignited fuel mixture emerging from the insert piece after the onset of ignition suffers a reduction in velocity, and this has an unfavourable effect on the utilisation of the air in the cylinder space, since the emergent burning mixture is not dispersed rapidly enough over the cylinder space.

The present invention is based upon the discovery that the distribution of the fuel mixture over the cylinder space can be considerably improved by interposing between the insert piece and cylinder space a cylindrical constriction, which is symmetrically disposed with reference to the injection nozzle axis and which has a cross-sectional area which is between once and twice the sum of the least cross-sectional areas of the inner and outer ducts of the insert piece. In this way the power output of the engine can be improved and the degree of smokiness in the exhaust lessened.

According to the present invention there is provided an internal combustion engine of the liquid fuel injection compression ignition kind comprising a cylinder having a working chamber, a piston slidable in the cylinder and having a crown with a depression therein, a cylinder head defining an open mouth auxiliary combustion chamber, an insert piece positioned in the mouth of the auxiliary combustion chamber and facing said depression, said insert piece defining with the cylinder head an air gap, said insert having an inner sleeve defining an inner duct, an outer sleeve surrounding and coaxial with said inner sleeve, a plurality of rib-like structures interconnecting said sleeves, said sleeves and structures defining between them a plurality of outer ducts, a cylindrical wall portion defining a constricted communicating channel between said ducts and said depression and coaxial with said inner duct and a fuel injection nozzle projecting into said auxiliary combustion chamber and disposed symmetrically in relation to the axis of the auxiliary combustion chamber so that a fuel stream injected into said auxiliary combustion chamber towards the end of the compression stroke of the piston is directed towards the inner duct and comes at its greatest diameter substantially into contact with the wall of the inner duct, the dimensions of the auxiliary combustion chamber, the inner and outer ducts and the depression being such that at the end of the compression stroke of the piston between 30% and 70% of the combustion air is in the auxiliary combustion chamber and ducts, the ratio of the least cross-sectional area of the inner duct to the sum of the least cross-sectional areas of the outer ducts ranging between 1:1 and 1:10, the sum of the volumes of the auxiliary combustion chamber and the inner and outer ducts measured in cm.$^3$ divided by the sum of the least cross-sectional areas of the inner and outer ducts measured in cm.$^2$ lying between 20 and 100 cm., and the ratio of the cross-sectional areas of said constricted channel to the sum of the least cross-sectional areas of said inner and outer ducts ranging between 1:1 and 2:1.

It has been previously proposed to employ constrictions with insert pieces. With such previous proposals however the use of the known insert pieces give rise to a high air velocity in the inner duct on the compression stroke, as a result of which the fuel jet is retained in the auxiliary chamber. In consequence therefore with the known insert pieces the core of the fuel jet does not contact the inner wall of the inner duct at full load speed, and there is therefore only inadequate vapourisation of the fuel. The consequence is a comparatively long ignition delay and hence noisy running and considerable dependence upon the ignition quality of the fuel. In the case of an engine in accordance with the present invention however the throttling produced by the insert piece is so small that the core of the fuel jet contacts the wall of the inner duct, is vapourised there and then burns with a very short ignition delay. It has been found that moderate constriction of the firing channel does not interfere with this process. The optimum values with regard to smoothness of combustion and non-reliance upon particular qualities of fuel are obtained with constrictions which have about double the sum of the least cross-sectional areas of the ducts of the insert piece. If the constriction has the same cross-sectional area as the ducts, the power obtainable is higher but combustion is somewhat noisier. If, as is the case with the known insert pieces, the constriction has a somewhat smaller cross-section than that of the ducts, only the usual auxiliary chamber effect can be obtained.

In order that undesirable throttling should not take place between the insert and the constriction, the insert merges with the constriction via a conical surface, the maximum diameter of which is substantially equal to the external diameter of the outer sleeve whilst the minimum internal diameter of which is equal to the diameter of the constriction, the cone angle being 120° and the distance from the edge of the constriction to the adjacent edge of the insert piece being between one quarter and one tenth of the diameter of the constriction.

With water-cooled engines the constriction is preferably defined by a wall of the cylinder head.

With air-cooled engines, the constriction preferably consists of a bush of heavy metal, cast into the light-metal cylinder head and arranged to receive the insert piece.

Figure 2:
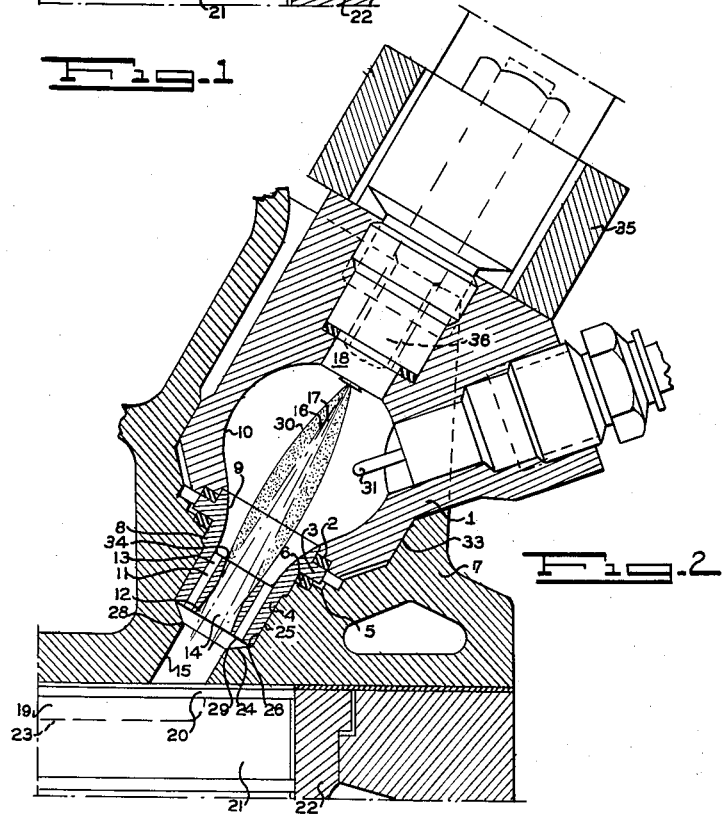

For a better understanding of the invention and to show how the same may be carried into effect reference will now be made to the accompanying drawings in which:

Figure 1 is a sectioned view of part of an air-cooled diesel engine in accordance with the invention, and Figure 2 is a sectioned view of part of a water-cooled diesel engine.

Referring to the drawings, in both cases an auxiliary chamber 1 is secured to the cylinder head 7 by means of a flange 35 and two screws 36. The flange 35 surrounds an injection nozzle 18 and engages the outer, less-heated part of the auxiliary chamber 1. As a result the auxiliary chamber 1 is pressed with the interposition of a packing 2 on to the flange 3 of an insert piece 4, which in its turn rests with the interposition of a packing 5 on the adjacent surface 6 of the cylinder head 7.

The insert piece 4 comprises an outer sleeve 8, the surface of which, at the point 9, forms a continuous surface with the auxiliary chamber inner wall 10. The sleeve 8 is connected to an inner coaxial sleeve 12 by means of interconnecting ribs 11. The sleeves 8 and 12 and the ribs 11 define between them a plurality of outer ducts 13, whilst the sleeve 8 defines an inner duct 14. The auxiliary chamber 1, the inner duct 14 and a cylindrical constriction 15, viewed in the spraying direction of the fuel jet 16 are symmetrically arranged, with reference to the fuel jet axis 17, and succeed each other between injection nozzle 18 and cylinder space 19. The injection nozzle is a pilot pin nozzle or some other form of one-hole nozzle.

The cylinder space 19 is constituted substantially by a dead space 20, which is bounded by the piston 21, the cylinder head 7 and the cylinder 22, and by a shallow depression 23 formed in the piston. Between the insert piece 4 and constriction 15 there is formed a conical surface 24, the maximum diameter of which is substantially equal to the outer diameter of the outer sleeve 8 of the insert piece 4. Between the outer sleeve 8 and the bore 25 in which the insert 4 is disposed is a gap preferably 0.1–0.2 mm. wide and thus not large enough to be visible in the drawing. The bore 25, in the case of the air-cooled engine shown in Figure 1 is formed by a bush 27 cast into a light-metal cylinder head 7. In the case of the water-cooled engine, as shown in Figure 2, the cylinder head 7 itself defines the constriction 15.

The minimum diameter of the conical surface 24 is substantially equal to the diameter of the constriction 15. The dimensions of the auxiliary chamber 1 and insert piece 4 are such that at the end of the compression stroke of the piston, between 30% and 70% of the combustion air is in the auxiliary chamber and the ducts. Furthermore the volume of the auxiliary combustion space measured in cm.$^3$ divided by the sum of the least cross-sectional areas of the outer and inner ducts measured in cm.$^2$ gives a value lying between 20 and 100 cm. The cross-sectional area of the constriction 15 is equal to between once or twice said sum. The distance between the edge 28 of the constriction 15 and the adjacent edge 29 of the insert piece 4 is between one quarter and one tenth of the diameter of the constriction 15. The cone angle of the conical surface 24 is substantially 120°. This corresponds to the normal tip angle of spiral drills. The fuel jet consists of a core 16 surrounded by a droplet mist 30. The core substantially contacts the wall of the inner duct 14. Projecting into the auxiliary chamber 1 is a glow plug 31, which provides the necessary heat on starting.

In the case of the air-cooled construction shown in Figure 1, cooling of the auxiliary chamber is by means of cooling air, which by means of fins 32 dissipates the heat generated. In the case of the water-cooled construction shown in Figure 2, the dissipation of heat is effected by means of a contact surface 33. The surface area of the fins 32 and the magnitude of the contact surface 33, as well as the gap between the auxiliary chamber 1 and the cylinder head 7 in the region of the contact surface, which normally amounts to a few hundredths of a mm., may be varied by adjusting the correct temperature level.

The ratio of the least cross-sectional area of the inner duct 14 to the sum of the least cross-sectional areas of the outer ducts 13 ranges between 1:1 and 1:10. The ratio of the length of the auxiliary combustion space as measured from the nozzle mouth to the adjacent edge 34 of the insert piece 4 to its maximum diameter substantially ranges between 1.3:1 and 1:1. This relationship holds for a cylinder displacement of 0.7 to 1.5 litres per cylinder. The injection pressure is between 100 and 180 kg./cm.$^2$. The ratio of the heat-dissipating total cross-sectional areas of the ribs 11 to the inner surface area of the inner duct 14 lies between 1:0.5 and 1:2. The feed commencement of the injection pump lies about 20–25° above the upper dead centre at 2000 r.p.m. While the engine is running, the temperature of the inner sleeve 12 lies substantially between 450 and 650° C. The temperature of the outer sleeve 8 of the insert piece 4 at the point 9 lies approximately in the region of 300° C.

I claim:

An internal combustion engine of the liquid fuel injection compression ignition kind comprising a cylinder having a working chamber, a piston slidable in the cylinder and having a crown with a depression therein, a cylinder head defining an open mouth auxiliary combustion chamber, an insert piece positioned in the mouth of the auxiliary combustion chamber and facing said depression, said insert piece defining with the cylinder head an air gap, said insert having an inner sleeve defining an inner duct, an outer sleeve surrounding and coaxial with said inner sleeve, a plurality of rib-like structures interconnecting said sleeves, said sleeves and structures defining between them a plurality of outer ducts, a cylindrical wall portion defining a constricted communicating channel between said ducts and said depression and coaxial with said inner duct, a fuel injection nozzle projecting into said auxiliary combustion chamber and disposed symmetrically in relation to the axis of the auxiliary combustion chamber so that a fuel stream injected into said auxiliary combustion chamber towards the end of the compression stroke of the piston is directed towards the inner duct and comes at its greatest diameter substantially into contact with the wall of the inner duct, the dimensions of the auxiliary combustion chamber, the inner and outer ducts and the depression being such that at the end of the compression stroke of the piston between 30% and 70% of the combustion air is in the auxiliary combustion chamber and ducts, the ratio of the least cross-sectional area of the inner duct to the sum of the least cross-sectional areas of the outer ducts ranging between 1:1 and 1:10, the sum of the volumes of the auxiliary combustion chamber and the inner and outer ducts measured in cm.$^3$ divided by the sum of the least cross-sectional areas of the inner and outer ducts measured in cm.$^2$ lying between 20 and 100 cms. and the ratio of the cross-sectional areas of said constricted channel to the sum of the least cross-sectional areas of said inner and outer ducts ranging between 1:1 and 2:1, and a conical wall portion defining a conical channel communicating at the wider end thereof with said ducts and at the narrower end thereof with said constricted channel, the maximum diameter of said conical channel being substantially equal to the external diameter of said outer sleeve, the minimum diameter of said conical channel being substantially equal to the diameter of said constricted channel, said conical wall portion defining a cone angle substantially of 120°, said insert piece being spaced from said constricted channel by an amount which ranges between 0.1 and 0.25 times the diameter of said constricted channel.

References Cited in the file of this patent

UNITED STATES PATENTS

| | | |
|---|---|---|
| 2,201,220 | Bokemuller et al. | May 21, 1940 |
| 2,853,060 | Hockel | Sept. 23, 1958 |

FOREIGN PATENTS

| | | |
|---|---|---|
| 665,507 | Germany | Sept. 28, 1938 |
| 363,400 | Italy | Oct. 4, 1938 |

UNITED STATES PATENT OFFICE
CERTIFICATION OF CORRECTION

Patent No. 2,972,987                          February 28, 1961

Walter Steidler

It is hereby certified that error appears in the above numbered patent requiring correction and that the said Letters Patent should read as corrected below.

In the grant, lines 1, 2 and 3, for "Walter Steidler, of Ilvesheim, Germany," read -- Walter Steidler, of Ilvesheim, Germany, assignor to Motoren-Werke Mannheim A. G. vorm. Benz. Abt. Stat. Motorenbau, of Mannheim, Germany, a German company, --; line 12, for "Walter Steidler, his heirs" read -- Motoren-Werke Mannheim A. G. vorm. Benz. Abt. Stat. Motorenbau, its successors --; in the heading to the printed specification, lines 3 and 4, for "Walter Steidler, Feudenheimerstrasse 38, Ilvesheim, Germany" read -- Walter Steidler, Ilvesheim, Germany, assignor to Motoren-Werke Mannheim A.G. vorm. Benz. Abt. Stat. Motorenbau, Mannheim, Germany, a Germany company --.

Signed and sealed this 12th day of September 1961.

(SEAL)
Attest:
ERNEST W. SWIDER
Attesting Officer

DAVID L. LADD
Commissioner of Patents